Figure 2A:
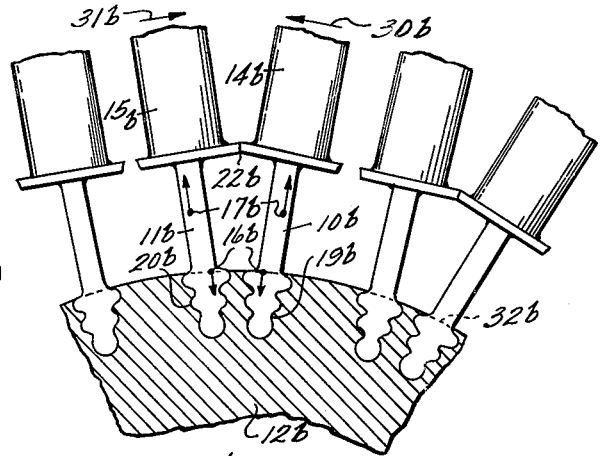

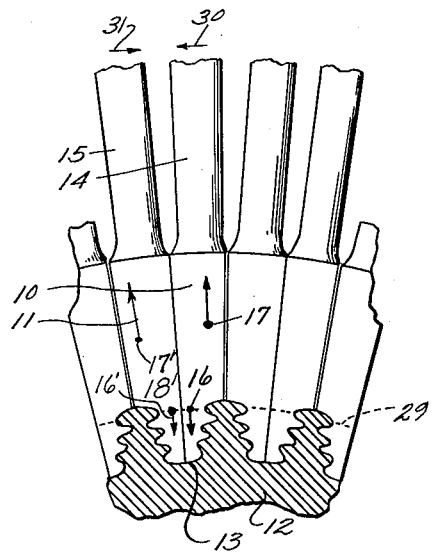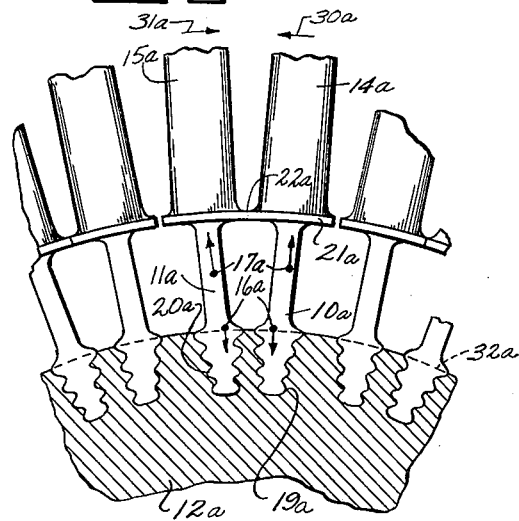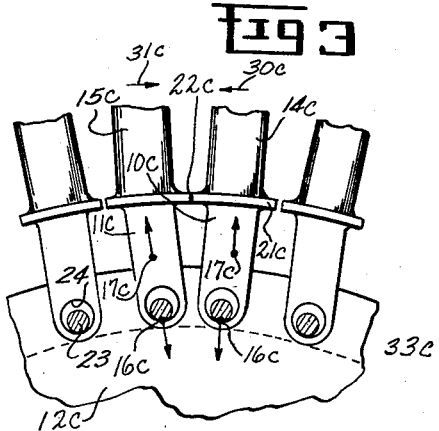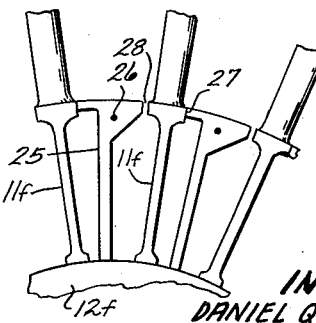

June 27, 1961 D. Q. MARSHALL ET AL 2,990,156
BLADE DAMPING MEANS
Filed Aug. 17, 1956 2 Sheets-Sheet 2

INVENTORS.
DANIEL Q. MARSHALL
HARVEY W. MASON
DAVID R. DAVIS
MELVIN BOBO
WILLIAM B. CAMPBELL

United States Patent Office 2,990,156
Patented June 27, 1961

2,990,156
BLADE DAMPING MEANS
Daniel Quayle Marshall, Kenwood, Harvey Waldo Mason, Sharonville, David Robert Davis, Hamilton, Melvin Bobo, Cincinnati, and William Bowles Campbell, Hamilton, Ohio, assignors to General Electric Company, a corporation of New York
Filed Aug. 17, 1956, Ser. No. 604,836
7 Claims. (Cl. 253—77)

This invention relates to blade damping means and, more particularly, to an arrangement for damping the vibration of blades employed in turbo-machinery, such as compressors, turbines and the like.

In modern high speed turbo-machinery, such as compressors, turbines, and the like, employing stress reducing flexible shank blades, vibration of the blading can become a serious problem. During rotation, vibratory forces set the flexible shank blades in motion and can be destructive of the blades unless means are provided for eliminating or damping the vibration. Since inherently it is difficult, if not impossible, to eliminate the vibrations, it is a common expedient to reduce their intensity and prevent destruction of the blades by suitable damping means. One means that has been employed in the past is to provide loose members between the flexible shanks of adjacent blades, which members are thrown radially outwardly by centrifugal force to jam or wedge the adjacent shanks and damp the blade vibration. Another means employed is the use of separate loose members between the flexible blade shanks which members co-operate with the blade shank to develop a friction force between the members and shank, and thus damp the vibration. While these damping means have been successful, they have required special shapes for the blade shanks and separate parts to cooperate therewith and provide the damping. Thus, a relatively complicated design is required to provide successful damping.

The primary object of the present invention is to provide damping means for flexible shank blades which depends upon the blades alone and requires no additional parts.

A further object is to provide such a damping means for flexible shank blades which is controlled by asymmetric construction of the blades to utilize the inherent centrifugal force that is present in rotating machinery.

Another object of the present invention is to disclose a damping means that is inherent in the blade structure itself, when properly constructed in accordance with the invention, without the necessity of supplying additional and separate elements.

An additional object of the invention is to disclose a damping means that may utilize a centrifugally actuated rotating member to apply force to the blade to damp the vibrations thereof.

Briefly stated, in accordance with one aspect of our invention, we provide an asymmetric blade structure so that two or more adjacent blades of a compressor or turbine or the like are attached to the supporting wheel-like member in such a manner that they are forced together by centrifugal loads when in operation. Minute sliding on a contact or rubbing surface between the blades, which are forced together by centrifugal force, provides a means of dissipating vibratory energy. The flexible shank blades are constructed so that the center of support of each blade and the center of mass above said support are offset so that a moment is developed under the action of centrifugal force to move adjacent blades, when used in pairs, towards each other during rotation whereby the common contact surface between the blades provides a means for dissipating vibratory energy. A modification is shown in which the blade structure may be symmetric with an adjacent asymmetric centrifugally actuated member to provide the rubbing and damping function.

Our invention will be better understood from the following description taken in connection with the accompanying drawing and its scope will be pointed out in the appended claims.

Figure 3A:
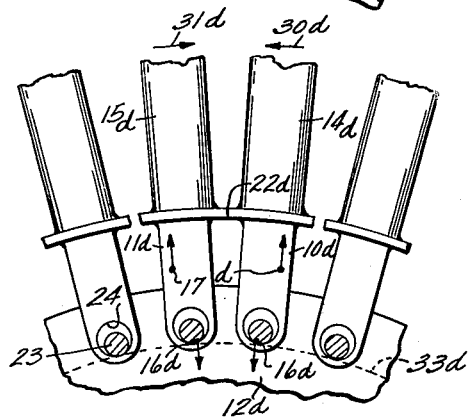
Figure 4:
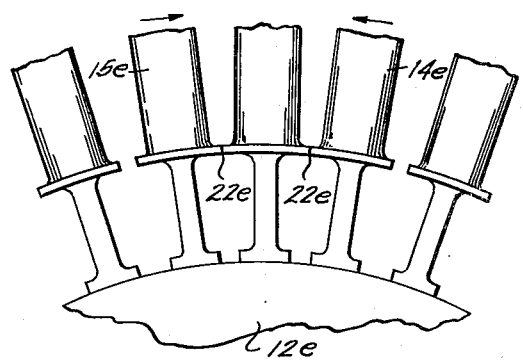

In the drawing:
FIGURE 1 is partial cross sectional view showing the invention applied to flexible shank blades having a common dovetail for two airfoil sections;
FIGURES 2 and 2A are partial cross sectional views, similar to FIGURE 1, showing alternate arrangements wherein the flexible shank blades have separate dovetails;
FIGURES 3 and 3A are partial cross sectional views showing the application of the invention to blades having a pin-mounting;
FIGURE 4 is a view showing the invention applied to another modification; and
FIGURE 5 is a partial cross sectional view showing the application of the invention in a modified form.

Referring first to FIGURE 1, there is shown a "Siamese" bucket assembly which is composed of two flexible shank members 10 and 11 connected to a rotating member, such as wheel 12, by a common dovetail connection 13, each shank member 10 and 11 being connected to an airfoil 14 and 15, respectively. The blades illustrated are of the flexible shank-type wherein flexibility is depended upon to give the most favorable stress pattern in operation as compared to a blade of the rigid type. In FIGURE 1, shank members 10 and 11 are flexible within the meaning of this definition. The rigid portion of the blades is found in dovetail 13. Thus, the shank portions represented by members 10 and 11 are movable relative to one another during rotation of the wheel 12. The plane of support of such an arrangement is that plane above which the blade derives no additional support from wheel 12. Thus, in FIGURE 1, the plane of support is shown as a dotted line 29 that encompasses all load transferring surfaces of the dovetail 13. The center of support of each blade is that point in the plane of support where the blade support may be considered as acting at a point. In FIGURE 1, the center of support for blade shank 10 is shown at 16. The radial arrow directed inwardly from point 16 is a vector representation of the amount and direction of support that the blade derives from the wheel 12. Shank member 11 has a similar center of support 16'. The center of mass of each blade above the plane of support is shown at 17 for blade member 10 and 17' for blade member 11, the arrow representing the direction and amount of centrifugal force acting through this point for any given rotative speed. By properly disposing the center of support and the center of mass laterally in the plane of the wheel or circumferentially from one another, it can be seen that a moment is set up tending to rotate blade shank 10 counter-clockwise, as shown by the arrow 30. In a similar manner, blade member 11 is rotated clockwise during rotation of wheel 12 as shown by the arrow 31. In other words, the flexible blade shanks 10 and 11 act as cantilever beams with their fixed support at the plane of support or at the wheel periphery in FIGURE 1. In order to derive damping from the rotating or vibratory movement of the blades, a common contact or rubbing surface 18 is provided between adjacent blades to take advantage of the force component normal to surface 18 which normal force times the coefficient of friction results in a friction force between the adjoining surfaces of the blades. Thus, the friction force, and the relative motion between the adjacent blades produced by vibration, dissipates the vibratory energy of the blades. It can be seen that the friction force may be controlled by proper positioning of the center of support and the center of mass of the respective blades. By controlling this asymmetry of loading of the blades, the normal force which produces the frictional force for damping may be controlled. It is merely necessary that the respective centers be so disposed that the adjacent blades tend to move toward one another during rotation of wheel 12 and thus the centers of mass of the blades must be located at a greater angular or lateral distance from each other than the centers of support of the adjacent blades. In addition, the distance between the centers of support preferably should be included within the angle subtended by the distance between the centers of mass of the adjacent blades. In other words, the centers of support are "straddled" by centers of mass or, the sector of the circle including the centers of support is included within that sector of the circle containing the centers of mass. While it is preferable that the rubbing surface 18 be a radial surface, it is not essential to the operation of the damping arrangement that this be so.

Referring next to FIGURE 2, wherein like numerals refer to like parts, a blade assembly is shown wherein the flexible shanks or halves 10a and 11a are provided with separate dovetail supports 19a and 20a, respectively. In addition, the blades have a platform portion 21a which portion has a common rubbing or contacting surface 22a for abutment with the opposed surface on the adjacent blade. The centers of support 16a and centers of mass 17a of the blade mass above the plane of support are again disposed in the same manner as that described in FIGURE 1 so that during rotation of wheel 12a, the adjacent blades of the pair are moved together by the moments on the blades illustrated by the arrows 30a and 31a to provide the controlled friction damping force at contact surface 22a. It will be apparent that the centers may be offset in accordance with the invention of FIGURE 2 by constructing the blade so that the mass is distributed such that the center of mass 17a is offset from the center line of the blade in a direction away from the contacting surface 22a. However, an alternative construction to provide the same result may be achieved by the asymmetric loading shown in FIGURE 2A wherein shanks 10a and 11a are inclined to the radius of the wheel 12a to permit the blades to be constructed with the mass evenly distributed. That is, the center line of the blade shank is canted with respect to the radius of the wheel 12a.

FIGURES 3 and 3A show the application of the invention to the pin-type blade construction. In this figure, the flexible shank portions 10c and 11c of the blade cooperate with a pin 23 which may be integral with or separate from the wheel 12c. The pin 23 holds the blade on wheel 12c by means of slots 24 in a conventional manner. The purpose of the pin-type blade fastening is to permit the blades to seek their own radial position on the wheel and avoid the stress conditions present in the more rigid type of mounting. As can be seen in FIGURE 3, the plane of support 33c is radially inwardly of the wheel periphery and again is defined as the plane below which the blade derives no additional support from the wheel and in the construction shown, is a line support. Consequently, the center of support 16c is similarly located inwardly of the wheel periphery. The center of mass 17c is again the center of the blade mass above the plane of support. By properly disposing the center of support 16c and the center of mass 17c, as previously described, the blades of each pair will move toward one another during rotation of wheel 12c as shown by the arrows 30c and 31c to provide controlled damping at contact surface 22c on platform 21c. In a manner similar to that described for FIGURE 2, the asymmetric loading and offset centers may be achieved by the proper distribution of the mass as shown in FIGURE 3A or it may be effected by the non-radial arrangement of the shank members 10c and 11c as shown in FIGURE 3.

Since the vibration may be measured and the damping required is a function of the vibration, the blade assemblies can be designed to operate in accordance with the invention in the manner hereinabove described to provide the controlled damping. The asymmetry of loading is merely built into the blade assemblies to provide the controlled damping required under the operating conditions to which the blades are subjected.

It will be apparent that the instant invention may be employed wherein the blades appear in groups of three as shown in FIGURE 4. In such an embodiment, the center blade may be a standard type blade and the adjacent asymmetrically loaded blades 14e and 15e will be moved against the center blade to rub at surfaces in either manner described for the preceding figures. While this arrangement is possible, it will be noted that three types of blades are thus required for the wheel and, for this reason, the modifications of FIGURES 1–3 are preferred since they require only two types of blades per wheel.

An additional modification employing the principle of the present invention is shown in FIGURE 5 wherein the blades 11f may be symmetrical in construction and attached to wheel 12f in any suitable manner, such as by a dovetail as shown in FIGURE 2, or by the pin arrangement shown in FIGURE 3. To provide damping there is provided adjacent each blade 11f an additional centrifugally actuated element 25 which may be attached to wheel 12f in any suitable manner. Element 25, using the principle of the present invention, has a center of mass offset from the radial line through its center of support and a rubbing surface so that, when wheel 12f rotates, element 25 is forced against blade 11f at rubbing surface 27 to damp the vibrations of the blade. It is to be noted that element 25 may be an additional element or may be incorporated as part of the spacer element between blades which is common in many installations. Thus element 25, as shown, may act also as a spacer. The proper design of element 25 as to its weight and center of mass will control the amount of side load of friction force that will be developed at rubbing surface 27, and thus the damping force again may be controlled damping. While this design may require the additional elements 25, as stated above, these elements may be incorporated as part of the conventional spacers so that, in fact, no additional structure is required other than a relocation of the weight distribution in the spacer. It is preferable that each blade and its associated element 25 operate as a unit which means that a clearance 28 will normally be provided between adjacent units. Thus, preferably the only contact is made at rubbing surface 27.

While particular embodiments of the invention have been illustrated and described, it will be obvious to those skilled in the art that various changes and modifications may be made without departing from the invention, and it is intended to cover in the appended claims all such changes and modifications that come within the true spirit and scope of the invention.

What we claim as new and desire to secure by Letters Patent is:

1. Damping means for turbomachinery and the like comprising a rotatable member, a plurality of pairs of radially extending pivoted blades carried by said rotatable member on the periphery thereof having free limited movement circumferentially of the rotatable member, each blade including an airfoil section, the center of support of each of said movable blades of a pair on said rotatable member being radially inward from the center of mass of the respective blades and circumferentially displaced toward each other in the plane of support whereby centrifugal force urges each movable blade toward the adjacent blade of a pair during rotation of said member, each blade having a generally radial contact surface in abutting relation with a similar contact surface of the adjacent blade, the contact surfaces being between the plane of support and the blade airfoils.

2. Damping means for turbomachinery and the like comprising, a rotatable wheel, pairs of abutting radially extending blades carried by said wheel and mounted on the periphery thereof, each blade including a flexible shank extending radially beyond the plane of support, the center of support of each blade of each pair being disposed inwardly of the center of mass of said blade and being circumferentially displaced therefrom toward the remaining blade of each pair to urge both blades of each pair towards each other during rotation of said wheel, each blade of a pair of blades having a radial contact surface in abutting relation with a similar contact surface of the adjacent blade of the pair, the contact surfaces being radially beyond the plane of support.

3. Damping means for turbomachinery and the like comprising, a rotatable wheel, pairs of abutting radially extending blades carried by said wheel and mounted in the periphery thereof, each blade including a flexible shank extending radially beyond the plane of support of the blade and a platform section at the radially outer end of the shank, the distance between the centers of support of the blades of a pair being shorter than the distance between the center of mass of the blades beyond the plane of support, said centers of mass being disposed radially outwardly of said centers of support whereby each blade of a pair is moved toward the other during rotation of said wheel, and a common radial rubbing surface between the platform sections of each blade of a pair to dampen the vibration of said blades.

4. Damping means for turbomachinery and the like comprising, a rotatable wheel, a plurality of first radially extending members supported on the periphery of the wheel, the members pivotally supported so that limited lateral movement is possible during rotation of the wheel and having a portion provided with rubbing surfaces thereon, the first members each having their center of support offset circumferentially in the plane of support so that upon rotation of the wheel centrifugal force urges the members to move in one circumferential direction, second members pivotally supported on the periphery of the wheel each positioned adjacent one of the first members and having a portion provided with rubbing surfaces thereon, said second members supported so that limited lateral movement is possible during rotation of the wheel, the second members each having their center of mass offset circumferentially from their center of support in the opposite sense from that of the first members so that upon rotation centrifugal force urges said second members to move in an opposite direction, so that the rubbing surfaces on the adjacent members engage each other to dampen vibration of the members.

5. Damping means for turbomachinery and the like comprising, a rotatable wheel, a plurality of first flexible radially extending members supported on the periphery of the wheel, each flexible member having a sufficient length with respect to the plane of support to be susceptible to vibration during rotation, rubbing surfaces on the first members, the first members each having the center of support offset circumferentially in the plane of support from the center of mass of the member which is radially outward from the plane of support so that upon rotation of the wheel, centrifugal force urges the members to move in one direction, second flexible radially extending members supported on the periphery of the wheel and each positioned adjacent one of the first members, each of the second members having radial rubbing surfaces thereon, the second members each having the center of support offset circumferentially from the center of mass in the opposite sense from the first members so that upon rotation of the wheel the second members are urged by centrifugal force to move in an opposite direction from the first members, whereby the rubbing surfaces engage to dampen vibration set up by the flexible members.

6. Damping means for turbomachinery and the like comprising, a rotatable member, a plurality of groups of radially extending blades mounted on the periphery of said rotatable member, each blade including an airfoil section, at least every other one of said blades of a group mounted to permit limited movement circumferentially of the rotatable member, the center of support of these movable blades being circumferentially displaced in the plane of support from the center of mass of said blades which is radially outward from the plane of support to move said blades towards an adjacent blade during rotation of said member, each blade having a generally radially extending contact surface in abutting relation with a similar contact surface of the adjacent blade, the contact surfaces being between the plane of support and the blade airfoils.

7. Damping means for turbo-machinery and the like comprising a rotatable member, a plurality of pairs of radially extending pivoted blades carried by said rotatable member on the periphery thereof having free limited movement circumferentially of the rotatable member, each blade including an airfoil section, the center of mass of each of said movable blades of a pair on said rotatable member being radially outward from the center of support of the respective blades and circumferentially displaced away from each other in a direction parallel to the plane of support whereby centrifugal force urges each movable blade toward the adjacent blade of a pair during rotation of said member, each blade having a generally radial contact surface in abutting relation with a similar contact surface of the adjacent blade, the contact surfaces being between the plane of support and the blade airfoils.

References Cited in the file of this patent

UNITED STATES PATENTS

| | | |
|---|---|---|
| 2,141,401 | Martinka | Dec. 27, 1938 |
| 2,781,998 | Barr | Feb. 19, 1957 |

FOREIGN PATENTS

| | | |
|---|---|---|
| 711,572 | Great Britain | July 7, 1954 |
| 844,774 | France | May 1, 1939 |
| 989,556 | France | May 23, 1951 |